United States Patent [19]

Sarle et al.

[11] 4,240,678

[45] Dec. 23, 1980

[54] NON-ROTATING FLUID DAMPED COMBINATION THRUST AND JOURNAL BEARING

[75] Inventors: Charles R. Sarle, Noblesville; Bruce R. Owen, Indianapolis, both of Ind.

[73] Assignee: Wallace Murray Corporation, New York, N.Y.

[21] Appl. No.: 13,976

[22] Filed: Feb. 22, 1979

[51] Int. Cl.³ ............................................ F16C 33/10
[52] U.S. Cl. ................................. 308/121; 308/122; 308/168; 308/240
[58] Field of Search ...................... 308/9, 37, 78, 106, 308/121, 122, 124, 135, 167, 168, 170, 237 A, 240, DIG. 4, DIG. 15

[56] References Cited

U.S. PATENT DOCUMENTS

| | | | |
|---|---|---|---|
| 2,719,065 | 9/1955 | Hornbostel | 308/122 |
| 3,390,926 | 7/1968 | Woollenweber | 308/122 |
| 3,811,741 | 5/1974 | McInerney et al. | 308/122 |

Primary Examiner—Frederick R. Schmidt
Attorney, Agent, or Firm—Thomas J. Greer, Jr.

[57] ABSTRACT

A fluid damped, non-rotating bearing construction for a high speed rotating shaft. A sleeve surrounds the shaft on which are mounted the impeller and compressor wheels, such as in a turbocharger. The sleeve is held against rotation and against significant axial movement by a longitudinally split, hollow metal pin. The sleeve functions as both a radial bearing and a thrust bearing.

9 Claims, 6 Drawing Figures

NON-ROTATING FLUID DAMPED COMBINATION THRUST AND JOURNAL BEARING

This invention relates to high speed rotating turbomachinery, such as a turbocharger. The invention exhibits utility in the mounting of the journal bearing for the high speed shaft so as to accept axial thrust loads while preventing bearing rotation. A turbocharger of the radial flow type has a compressor section and a turbine section separated by a bearing section. The turbine wheel and compressor wheel are on a common shaft. The relationship of the turbine and compressor wheels is one wherein during operation axial thrust on each are opposite, thus usually balancing one another. However, depending upon certain transient operating conditions the thrust of one will slightly override thrust of the other and there will accordingly arise a tendency for the shaft to move axially within the bearing section.

The shaft is mounted for rotation in an elongated sleeve bearing which is mounted within a housing between the turbine and compressor wheels. A lubricant is supplied from an external source to the sleeve bearing by a hole in the housing which connects to the housing bore. The sleeve bearing has connecting holes to the housing bore which permits the lubricant to continue to the shaft. The sleeve bearing is of type known as double film or free floating. This type has an oil film between the housing bore and the bearing outside diameter along with the oil film between the bearing inside diameter and the rotating shaft. The oil film is capable of accepting axial thrust loads when the rotating shaft has collars in close proximity to the bearing end faces. The foregoing arrangement is known in the art.

The bearing may be rotating or non-rotatable. The bearing, however, must be confined to a limited axial movement or attached to the bearing housing in order to accept axial thrust loads. Prior art has accomplished this by using a plate attached to the bearing housing usually on the compressor end of the unit. This stationary plate has a rotating collar on one side with the bearing face on the opposite side. As the bearing is confined between the collar on the turbine side and the plate, axial movement towards the compressor is restricted and the thrust load is taken through the oil film between one bearing end and the turbine side collar and the opposite end of the journal and the bearing oil film adjacent to the stationary plate. Axial movement and thrust loads towards the turbine end are provided by the compressor side collar and the stationary plate.

Rotating double film bearings exhibit stability problems largely due to the pumping action of the bearing which will rotate at a different speed than the shaft. In accordance with this invention, the bearing is non-rotatable. This is accomplished by utilizing the lubricant supply hole in the bearing housing to receive a hollow pin which when pressed into the hole will project into the sleeve bearing so as to confine the bearing against rotational and axial movement with respect to the housing. This pin now becomes a thrust element much as the prior art stationary plate. The pin is slotted to aid in delivering lubricant to the outer oil film around the bearing and to provide lubricant for an oil film around the pin itself. The hollow pin allows oil to be delivered to the shaft in the usual manner. The bearing has the pin hole in two locations 180° apart. That portion of the hole not occupied by the pin is the main lubricant feed path to the outer oil film. The pin thus serves the function of preventing rotation, while providing all lubricant to the bearing system, and acting as a thrust element along with the bearing end faces.

The two holes in the bearing, 180° apart, not only provide for the proper delivery of lubricant supply to the bearing portions, but also permits the pin to be pushed through the bearing upon shaft removal allowing bearing withdrawal from the bearing housing.

In operation, the oil exits the inner portion of the bearing at the ends and creates an oil film for axial thrust bearing capability at a shaft shoulder on the turbine side and a thrust sleeve locked against a shaft shoulder on the compressor side. The shaft shoulder and thrust sleeve are larger than the bearing ends to fling the exiting oil circumferentially into drain areas, thereby not only immediately directing the escaping oil away from the shaft seals, but also flinging the oil so as to prevent the reengagement of the shaft components by the oil. cl IN THE DRAWINGS FIG. 1 is an axial cross-sectional view through a representative turbocharger showing the specific shaft and bearing mounting in the housings.

Figure 1:
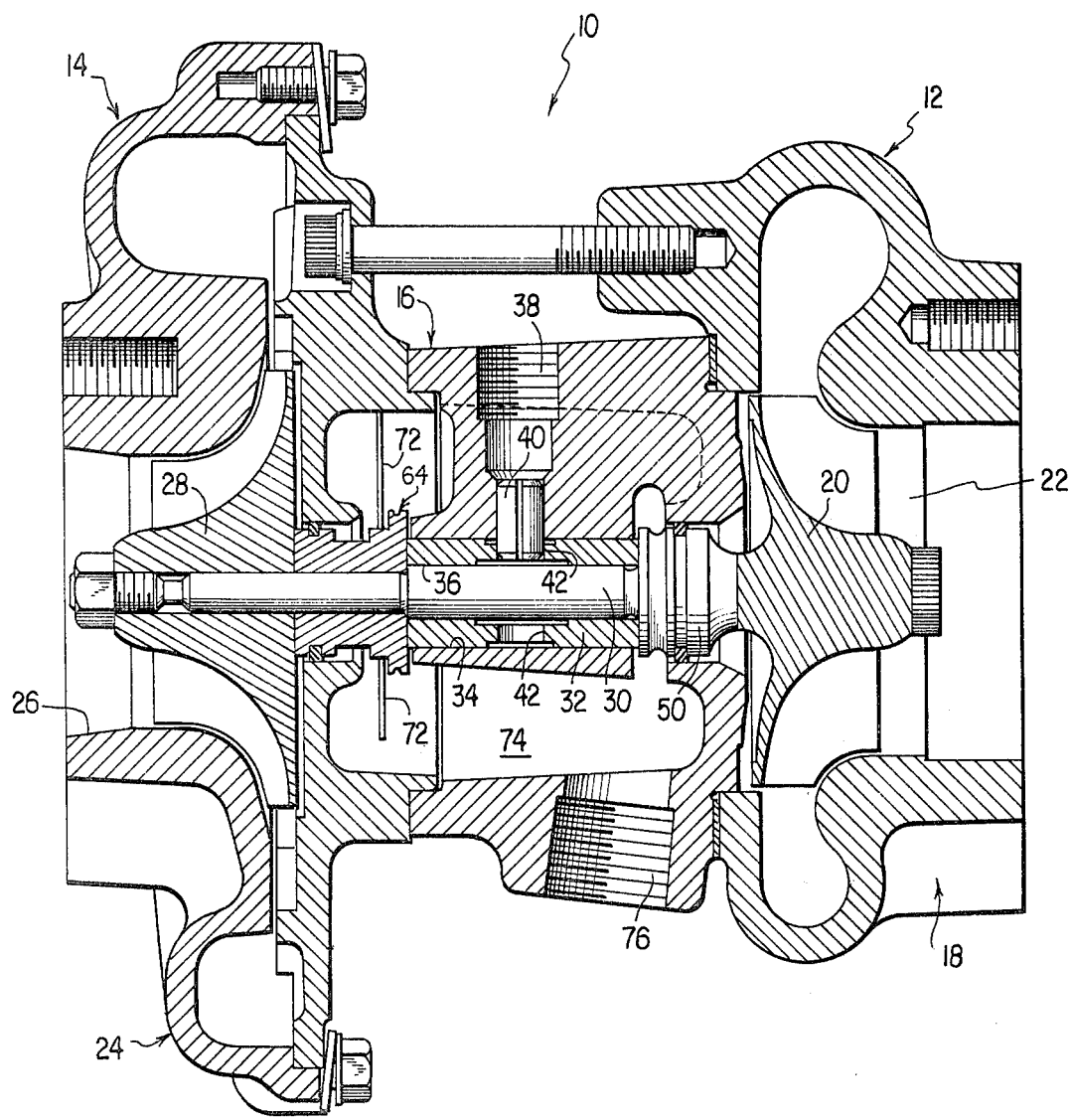
Figure 2:
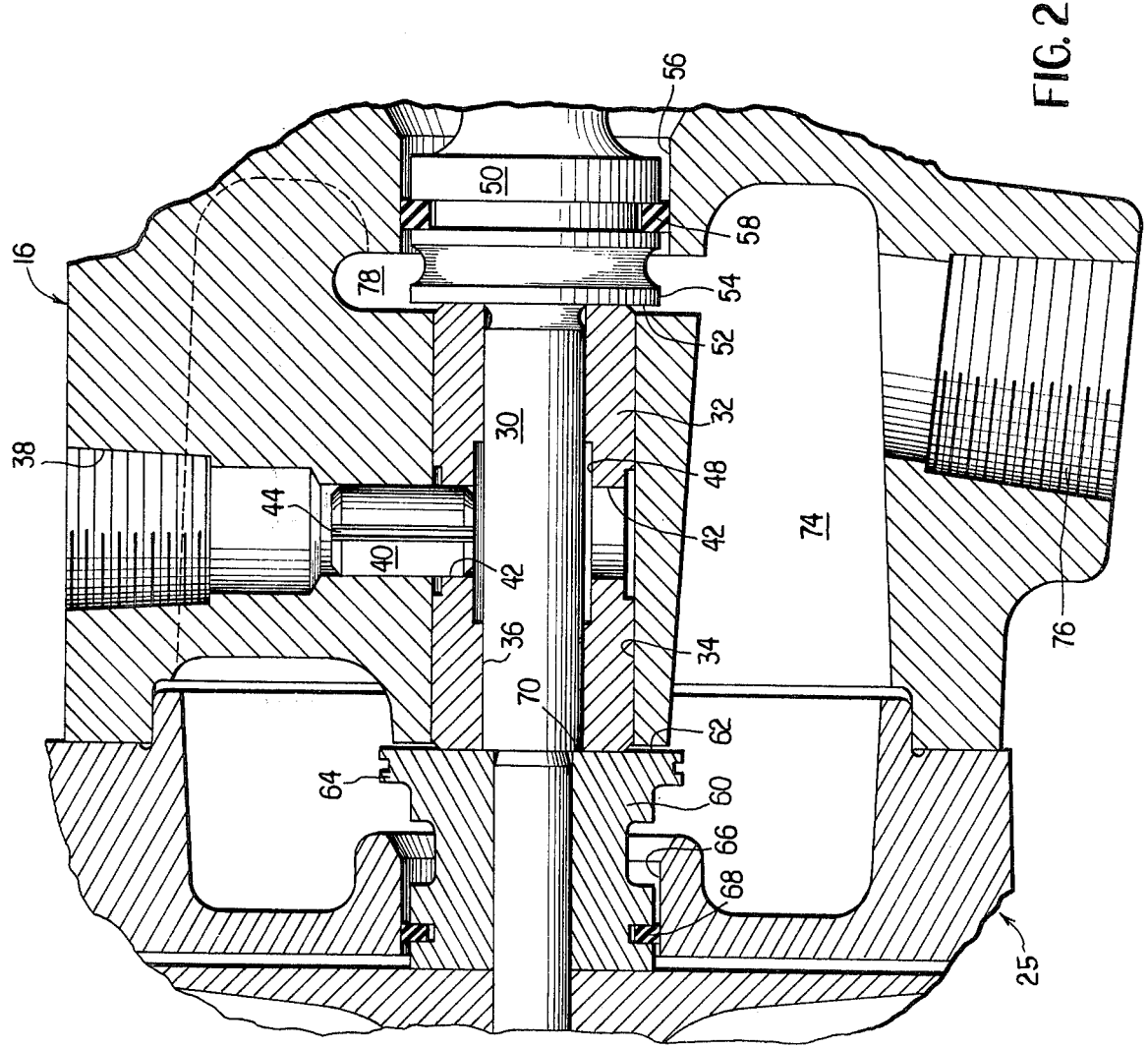
FIG. 2 is an enlarged fragmentary sectional view through the central portion of the bearing housing and most specifically shows the mounting of the sleeve bearing and the relationship of abutments carried by the shaft with respect to the ends of the sleeve bearings.

In FIGS. 1 and 2, the turbocharger is generally denoted by the numeral 10 and includes a turbine section 12 and a compressor section 14 separated by a bearing housing 16. The turbine section 12 includes a housing 18 through which exhaust gases are radially fed to a turbine wheel 20 causing rotation of the turbine wheel. The gases exit the turbine wheel axially through an outlet 22.

The compressor section 14 includes a housing 24 which, advantageously, may be of a two-piece contruction. The housing 24 has an axial air inlet 26 for admitting air to a compressor wheel 28, as well as a compressor flange plate 25.

The turbine wheel 20 and the compressor wheel 28 are mounted on a common shaft 30 with an intermediate section of the shaft 30 being rotatably journalled within a bearing sleeve 32 which is loosely received in a central axial bore 34 in the bearing housing 16. The sleeve bearing 32 has a bore 36 through which the central portion of the shaft 30 extends and in which the central portion of the shaft 30 is rotatably journalled. The sleeve bearing 32 thus functions as a radial bearing.

The bearing housing 16 has a hole 38 for receiving lubricant from an external source. The hole 38 opens into the axial bore 34. A hollow pin 40 is pressed into the hole 38 and extends into a clearance hole 42 in the sleeve bearing 32 to extend the lubricant supply hole 38 so that the bearing 32 is fixed relatively to the bearing housing 16 and lubricant is delivered to the central portion of shaft 30. The fixing of the bearing 32 to the housing 16 by the pin 40 allows the bearing 32 to be an axial thrust bearing in addition to its radial capability. It is to be understood that there will be clearance between the pin 40 and the hole 42 so as to allow a limited axial and rotational movement of the sleeve bearing 32 within the bearing housing 16 in addition to a radial movement for oil film damping. The pin 40 is specifically intended to resist all thrust loads on the sleeve bearing 32.

It is to be understood that the sleeve bearing 32 is preferably provided with a second hole 42 in diametrical alignment with the first mentioned hole 42. The second hole 42 performs two functions. Firstly, it provides the major flow of oil or lubricant to the exterior of the sleeve bearing 32 between the sleeve bearing 32 and the bearing housing 16 so as to affect the full floating of the sleeve bearing 32 within the bearing housing 16. Secondly, it facilitates the removal of the pin 40.

The pin 40 is of a longitudinally split construction so as to define a longitudinal slot 44. The slot 44 opens into the space between the sleeve bearing 32 and the bore 34 in the bearing housing 16 and thus supplies lubricant under pressure between the housing 16 and the sleeve bearing 32, thus forming an oil film between the sleeve bearing 32 and the housing 16. To further facilitate the flow of lubricant between the sleeve bearing 32 and the bearing housing 16, the sleeve bearing 32 is undercut circumferentially at 48 on the interior surface thereof in connection with the holes 42.

It will be readily apparent that the hollow interior of the pin 40 permits adequate lubricant flow therethrough to the sleeve bearing 32. Thus, at start up, when the shaft 30 commences rotation, there will be previously formed an oil film between the shaft 30 and the sleeve bearing 32 and a further oil film between the sleeve bearing 32 and the bearing housing 16.

The hollow pin 40 may be beneficially formed of spring metal so that it does not have to be machined to size, thus effecting a cost saving. At the same time, the pin 40 may be forced into a desired fit with the bearing housing 16 within the hole 38. As previously described, the hole 42 receiving the pin 40 is preferably of a larger diameter so that there will be a limited clearance between the sleeve bearing 32 and the pin 40 permitting both limited axial and rotational movement of the sleeve bearing 32 relative to the bearing housing 16.

Figure 3:
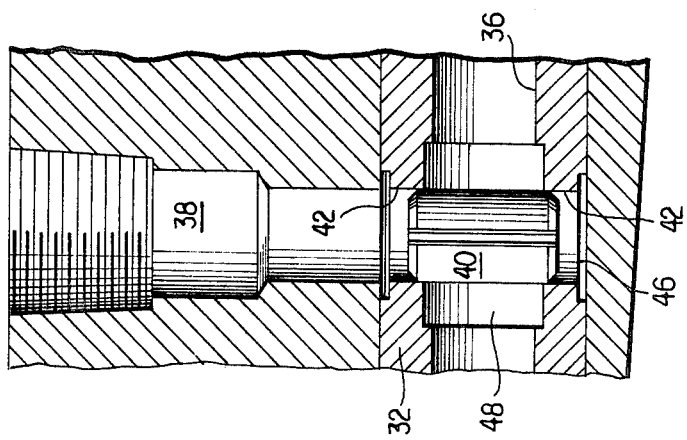
FIG. 3 is an enlarged fragmentary sectional view taken through the central portion of the bearing housing with the shaft removed and the pin pushed wholly into the confines of the bearing to permit withdrawal of the bearing from the bearing housing.

Reference is now made to FIG. 3 wherein it will be seen that the provision of the two holes 42 has a further advantage. As is clearly shown in FIG. 3, after the shaft 30 has been removed from the sleeve bearing 32, the pin 40 may then be pressed out of the hole 38 fully into the sleeve bearing 32. In order to accomplish this, the length of the pin 40 must, of course, be less than the diameter of the sleeve bearing 32. After the pin has been displaced in the manner shown in FIG. 3, the bearing 32 may be readily removed from the bearing housing 16.

Referring once again to FIG. 2 in particular, it will be seen that in order that the sleeve bearing 32 may have thrust bearing capability, the ends of the sleeve bearing extend axially beyond the adjacent portion of the bearing housing 16. Thus, the end faces of the sleeve bearing 32 define thrust bearing faces.

Adjacent the turbine end of the shaft 30, the shaft is provided with an enlargement, generally identified by the numeral 50. The enlargement 50 may be separately formed and secured to the shaft 30 for rotation therewith or may be integrally formed therewith. The enlargement 50 has a thrust face 52 which opposes the adjacent ends of the sleeve bearing 32 and thus the thrust face 52 together with the adjacent end of the sleeve bearing 32 may combine to function as an axial thrust bearing.

The enlargement 50 is configured adjacent the thrust face 52 to define a slinger 54 for flinging oil exiting between the thrust face 52 and adjacent end of the sleeve bearing 32 radially outwardly and away from the shaft 30.

The enlargement 50 extends into a bore 56 in an axial end portion of the bearing housing 16 and carries a sealing ring 58 which forms a seal between the enlargement 50 and the bearing housing 16, thereby sealing the bearing area from the turbine section 12.

At the opposite ends of the sleeve bearing 32, the shaft 30 is of a reduced diameter and carries a collar, generally identified by the numeral 60. The collar 60 has a thrust face 62 which opposes the adjacent ends of the sleeve bearing 32 and together therewith defines a second thrust bearing.

The collar 60 is configured immediately adjacent the thrust face 62 to define a lubricant slinger 64 which flings lubricant exiting from the adjacent end of the sleeve bearing 32 radially away from the shaft 30 in a manner to prevent the reengagement of the flung oil from again engaging the collar 60.

The collar 60 extends into a bore 66 formed by the compressor flange plate 25 in an adjacent portion of the compressor section housing 24 and is sealed relative thereto by means of a sealing ring 68. The sealing ring 68 seals the compressor section 14 from the bearing area.

It is also to be noted that the end of the collar 60 remote from the sleeve bearing 32 is positioned for abutment with the compressor wheel 28.

As is best shown in FIG. 1, if desired, the compressor flange plate 25 may be provided with an oil deflector 72 which is disposed between slinger 64 and flange plate 25 on the side thereof remote from the sleeve bearing 32.

As is shown in FIG. 2, the cental portion of the bearing housing 16 as well as an adjacent portion of the compressor flange plate 25, is partially hollow to define a drain chamber, generally designated by the numeral 74. Lubricant flowing out of the ends of the sleeve bearing 32 and being flung by the slingers 54 and 64 is received in the drain chamber 74, drains to the lowermost portion thereof and then flows out of a lubricant return passage 76 to drain back to the external lubricant supply.

Figure 5:
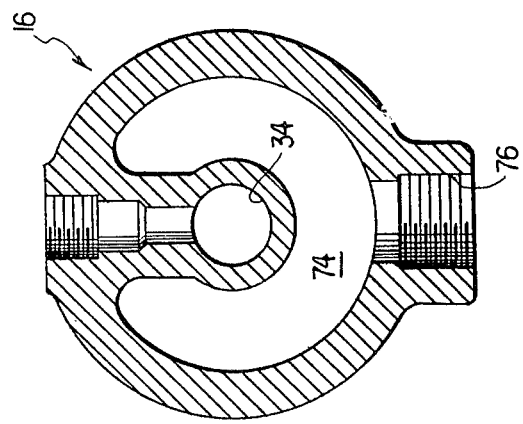
FIG. 5 is a transverse sectional view taken generally along the lines 5—5 of FIG. 4 and shows the cross-section of the drain chamber in the central portion of the bearing housing.
Figure 4:
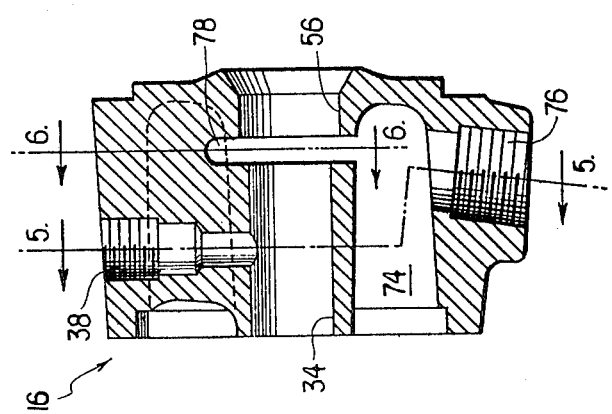
FIG. 4 is an axial cross-sectional view through the bearing housing per se and shows the general details of the drain chamber thereof.

As is clearly shown in FIGS. 4 and 5, that portion of the bearing housing 16 which receives the sleeve bearing 32 is held to a minimum size permitting the required structural strength. In transverse alignment with the sleeve bearing 32, the drain chamber 74 extends about the bearing area through an arc of about 300°. On the other hand as is shown in the drawings, the construction of the bearng housing 16 and the adjacent portion of the compressor flange plate 25 is such that the drain chamber 74 may extend completely around the compressor end of the bearing sleeve 32 through an arc of 360° so that lubricant exiting from the compressor end of the bearing sleeve 32 may be flung radially by the slinger 64 through the end to the drain chamber 74 for reflow to the bottom of the drain chamber 74 without recontacting the rotating collar 60. This eliminates any undue load on the seal 68. Further, since the slinger 62 is of a larger diameter than both the bearing sleeve and the adjacent portion of the bearing housing 16, all lubricant flowing out of the compressor end of the bearing sleeve 32 is primarily flung away from the rotating collar 60 by the slinger 62 and has secondary flinging action at 64.

Figure 6:
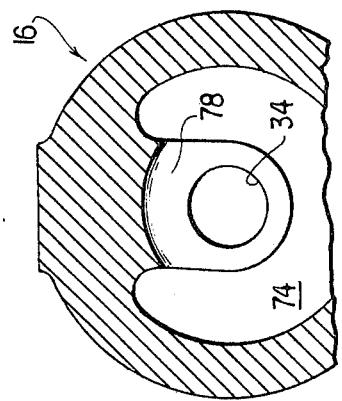
FIG. 6 is a fragmentary transverse sectional view taken generally along the lines 6—6 of FIG. 4 and shows specifically the details of a machined oil slot which assures the flow of flung oil around the shaft without reengagement therewith.

The construction of the bearing housing 16 at the turbine end of the sleeve bearing 32 is such that it is not possible to have the full open drain cavity configuration as described with respect to the compressor end of the sleeve bearing. However, it has been found that by way of a simple machining operation, the bearing housing 16 may be machined to define an oil slot 78 to extend through that arc occupied by the sleeve bearing supporting portion of the bearing housing 16. This is best shown in FIG. 6. The machined oil slot 78, as is best shown in FIG. 2, is transversely aligned with the slinger 54 and axially overlaps the adjacent end of the sleeve bearing 32. Thus all lubricant or oil exiting from the turbine end of the sleeve bearing 32 first encounters the thrust face 52, which is of a larger diameter than the sleeve bearing 32, and is directed radially outwardly. Since the thrust face 52 is rotating, it further urges the lubricant radially outwardly and in conjunction with the slinger 54 effects the flinging of the oil radially and circumferentially into the drain chamber 74. That portion of the lubricant flung radially outwardly to contact the machined oil slot 78, has a circumferential component and readily flows circumferentially around the oil slot 78 and down into the lower portion of the drain chamber 74.

The prior art is aware of constructions similar in certain respects to the construction of this invention. For example, U.S. Pat. No. 3,043,636 issued to MacInnes discloses a turbocharger having a non-rotatable double film sleeve bearing. This bearing has an integral flange on the compressor end of the bearing which has a hole through which an axial pin in the bearing housing enters to prevent rotation. Axial thrust is not taken through the pin. The bearing flange is sandwiched between the housing and a plate to restrict axial movement of the bearing. A collar rotating next to the flange restricts turbine directed thrust. Oil supply is through a hole in the bearing housing which communicates with a plurality of holes in the bearing. There is no element corresponding to the pin 40 of this invention which acts as a thrust element, a rotation preventer, and an oil supply.

U.S. Pat. No. 3,811,741 issued to McInerney also discloses a turbocharger having a sleeve bearing. In this case, there is a pin element. However, the pin has considerable clearance when projecting into the bearing. The pin prevents rotation but the sleeve bearing ends are not utilized to accent axial thrust. A separate thrust bearing system is used consisting of a rotating collar sandwiched between two stationary bearing surfaces. The pin portion extending into the bearing does not carry an oil supply.

What is claimed is:

1. A bearing structure for high speed rotating shafts comprising,
    (a) a housing,
    (b) a bore through said housing,
    (c) a radial sleeve bearing positioned within said bore and having opposite ends extending beyond said bore to function as an axial thrust bearing,
    (d) means anchoring said bearing to said housing against rotation and axial movement in said housing bore,
    (e) a shaft rotatably journalled in said sleeve bearing,
    (f) abutments carried by the shaft adjacent to said bearing ends forming thrust bearings,
    (g) said means for anchoring said sleeve bearing against rotational and axial movement in said housing being a hollow pin, said pin carrying thrust loads,
    (h) said sleeve bearing absorbing any net thrust on said shaft thus limiting axial displacement of said shaft,
    (i) said housing having a lubricant supply hole and said sleeve bearing having a first lubricant receiving hole receiving said hollow pin with said hollow pin providing a flow path for lubricant supply to said shaft and a second hole providing a flow path for lubricant supply for oil film at the bearing outside diameter.

2. The bearing structure of claim 1 wherein said hollow pin is longitudinally split to define a slot and whereby the split assures lubricant forming an oil film between said sleeve bearing and said housing upon start up, as well as an oil film between the sleeve bearing and said pin.

3. The bearing structure of claim 1 wherein said structure is part of a turbocharger, the ends of said shaft carrying turbine and compressor wheels.

4. The bearing structure of claim 1 wherein said sleeve bearing has a second hole aligned with said lubricant receiving hole and of a size to receive said pin, and said pin is of a length lesser than the diameter of said sleeve bearing wherein after said shaft has been removed, said pin may be driven from said lubricant supply hole fully into said sleeve bearing to permit removal of said sleeve bearing.

5. The bearing structure of claim 1 wherein said housing includes a drain chamber for receiving lubricant flowing from said sleeve bearing, said shaft carries slinger means at each end of said sleeve bearing, and said drain chamber extends entirely around said shaft in transverse alignment with each slinger means.

6. The bearing structure of claim 5 wherein said slinger means are of a greater diameter than said sleeve bearing.

7. The bearing structure of claim 1 wherein said hollow pin is formed of resilient material, whereby the pin need not be machined to size.

8. A bearing structure for high speed rotating shafts comprising,
    (a) a housing,
    (b) a bore through said housing,
    (c) a radial sleeve bearing positioned within said bore and having opposite ends extending beyond said bore to function as an axial thrust bearing,
    (d) a shaft rotatably journalled in said sleeve bearing,
    (e) abutments carried by the shaft adjacent to said bearing ends forming thrust bearings,
    (f) said housing including a drain chamber for lubricant flowing from said sleeve bearing,
    (g) said shaft carrying slinger means at each end of said sleeve bearing, and p1 (h) said drain chamber extending entirely around said shaft in transverse alignment with each slinger means.

9. The bearing structure of claim 8 wherein slinger means are of a greater diameter than said sleeve bearing.

* * * * *

UNITED STATES PATENT AND TRADEMARK OFFICE
CERTIFICATE OF CORRECTION

PATENT NO. : 4,240,678
DATED : December 23, 1980
INVENTOR(S) : CHARLES R. SARLE and BRUCE R. OWEN It is certified that error appears in the above—identified patent and that said Letters Patent is hereby corrected as shown below:

Column 6, line 63, "pl" should be deleted.

Signed and Sealed this

Seventeenth Day of March 1981

[SEAL]

Attest:

RENE D. TEGTMEYER

*Attesting Officer*   *Acting Commissioner of Patents and Trademarks*